United States Patent
Whitman et al.

(10) Patent No.: US 10,970,331 B2
(45) Date of Patent: Apr. 6, 2021

(54) DETERMINING CONTEXTUAL CONFIDENCE OF IMAGES USING ASSOCIATIVE DEEP LEARNING

(71) Applicant: International Business Machines Corporation, Armonk, NY (US)

(72) Inventors: Todd R. Whitman, Bethany, CT (US); Aaron K. Baughman, Silver Spring, MA (US); John P. Perrino, Hedgesville, WV (US); Diwesh Pandey, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 154 days.

(21) Appl. No.: 16/129,095

(22) Filed: Sep. 12, 2018

(65) Prior Publication Data

US 2020/0082002 A1  Mar. 12, 2020

(51) Int. Cl.
| | |
|---|---|
| *G06K 9/62* | (2006.01) |
| *G06F 16/58* | (2019.01) |
| *G06F 17/18* | (2006.01) |
| *G06K 9/32* | (2006.01) |
| *G06F 16/35* | (2019.01) |
| *G06F 40/30* | (2020.01) |

(52) U.S. Cl.
CPC .......... *G06F 16/5866* (2019.01); *G06F 16/35* (2019.01); *G06F 17/18* (2013.01); *G06F 40/30* (2020.01); *G06K 9/3241* (2013.01); *G06K 9/6267* (2013.01)

(58) Field of Classification Search
None
See application file for complete search history.

(56) References Cited

U.S. PATENT DOCUMENTS

| | | | |
|---|---|---|---|
| 9,773,196 B2 | 9/2017 | Sachs et al. | |
| 9,846,915 B2 | 12/2017 | Howe et al. | |
| 2008/0170796 A1* | 7/2008 | Hwang | G06T 7/12 382/266 |
| 2014/0013223 A1* | 1/2014 | Aamir | G06F 40/30 715/273 |
| 2017/0352083 A1 | 6/2017 | Ruck et al. | |
| 2018/0097762 A1* | 4/2018 | Garcia | G06Q 30/06 |
| 2018/0268595 A1* | 9/2018 | Sarna | G06T 13/80 |

OTHER PUBLICATIONS

Lopez, MM. et al.; "Deep Learning applied to NLP"; http://www.arxiv:1703.03091v1; Mar. 9, 2017.
Deng, L. et al.; "Deep Learning: Methods and Applications"; Foundations and Trends in Signal Processing, vol. 7, Nos. 3-4; pp. 197-387; 2013-2014.

* cited by examiner

*Primary Examiner* — Suhail Khan
(74) *Attorney, Agent, or Firm* — Garg Law Firm, PLLC; Rakesh Garg; James Nock

(57) ABSTRACT

Determining contextual confidence of images for associative deep learning includes receiving an image including a representation of a subject. Text data related to the image is received. One or more physical properties of the image are determined. Context information of the image is determined using natural language processing. The image is classified based upon the contextual information and the one or more physical properties using a classification model to determine a classification. An emotional state of the image is determined based upon the physical properties. A confidence of the classification and emotional state is determined.

14 Claims, 5 Drawing Sheets

DETERMINING CONTEXTUAL CONFIDENCE OF IMAGES USING ASSOCIATIVE DEEP LEARNING

TECHNICAL FIELD

The present invention relates generally to a method, system, and computer program product for determining contextual confidence of images. More particularly, the present invention relates to a method, system, and computer program product for determining contextual confidence of images using associative deep learning.

BACKGROUND

The taking of "selfies" and other images by users is becoming increasingly popular. A "selfie" is a self-portrait image of a user that is typically captured by an imaging device such as a camera or smartphone held in the hand of the user. Selfies generally depict a current location, event, environment, or other context associated with the image at the time of capture. Selfies are often casual in nature and depict the user in a particular context such as at a sporting event or party. Selfies are often shared on social network services along with related text provided by the user such as a textual description of the location and/or event.

SUMMARY

The illustrative embodiments provide a method, system, and computer program product. An embodiment of a method for determining contextual confidence of images for associative deep learning includes receiving an image including a representation of a subject, and receiving text data related to the image. The embodiment further includes determining one or more physical properties of the image, and determining context information of the image using natural language processing. The embodiment further includes classifying the image based upon the contextual information and the one or more physical properties using a classification model to determine a classification. The embodiment further includes determining an emotional state of the image based upon the physical properties, and determining a confidence of the classification and emotional state.

Another embodiment further includes updating the classification model based upon the determined confidence. In another embodiment, the classification model includes a deep neural network.

In another embodiment, the confidence of the classification and emotional state is determined using negative class training. In another embodiment, the negative class training includes using a probability distribution between a set of images with a known emotional state and a candidate image. In another embodiment, the probability distribution is a Skellam distribution. In another embodiment, the negative class training includes use of a Bessel function.

In another embodiment, the text data is included in a social media post associated with the image. In another embodiment, the one or more physical properties of the image include one or more of a facial expression of the subject in the image, background of the image, or a relationship of objects in the image. In another embodiment, the emotional state includes a mood of the subject.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments described herein are directed to determining contextual confidence of images using associative deep learning. One or more embodiments recognize that an existing problem in the posting of images, such as selfies, to social media platforms is the need for a human to label and classify an image to learn a context of the image. One or more embodiments are directed to the use of deep learning to analyze context and background information of an image, such as a selfie, acquired by a user to associate a subject or subjects with a particular scene. In an embodiment, a user takes selfies or other images of one or more subjects using an imaging device, such as a camera or cell phone, and classifies the images. Using deep learning, a system analyzes a context and background information of each image that has been classified, including a mood of one or more subject(s), in order to semantically associate a subject or set of subjects with a particular scene. A combination of information gathered by the system is then fused into a deep learning process to continually increase the accuracy of the classification of additional photos taken.

An Artificial Neural Network (ANN)—also referred to simply as a neural network—is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex but on much smaller scales. A large ANN might have hundreds or thousands of processor units, whereas a mammalian brain has billions of neurons with a corresponding increase in magnitude of their overall interaction and emergent behavior. A feedforward neural network is an artificial neural network where connections between the units do not form a cycle.

In machine learning, a convolutional neural network (CNN) is a type of feed-forward artificial neural network in which the connectivity pattern between its nodes (neurons) is inspired by the organization of the animal visual cortex, whose individual neurons are arranged to respond to overlapping regions tiling a visual field. Convolutional networks mimic biological processes and are configured as variations of multilayer perceptrons designed to use minimal amounts of preprocessing while processing data, such as digital images.

Convolutional neural networks (CNN) are networks with overlapping "reception fields" performing convolution tasks. A CNN is particularly efficient in recognizing image features, such as by differentiating pixels or pixel regions in a digital image from other pixels or pixel regions in the digital image. Generally, a CNN is designed to recognize images or parts of an image, such as detecting the edges of an object recognized on the image. Computer vision is a field of endeavor where CNNs are commonly used.

A deep neural network (DNN) is an artificial neural network (ANN) with multiple hidden layers of units between the input and output layers. Similar to shallow ANNs, DNNs can model complex non-linear relationships. DNN architectures, e.g., for object detection and parsing, generate compositional models where the object is expressed as a layered composition of image primitives. The extra layers enable composition of features from lower layers, giving the potential of modeling complex data with fewer units than a similarly performing shallow network. DNNs are typically designed as feedforward networks.

Deep learning attempts to reconstruct input along each layer of a neural network. In such deep learning systems, the input of the system needs be highly confident that an image is what the ground truth indicates, the ground truth being the actual context of the image at the time of capture. In one or more embodiments, selfies are utilized to determine a spherical confidence of a ground truth label with the use of contextual information. The context or background of an image is important in deep learning to enable the deep learning network to semantically associate a subject or set of subjects with a particular scene.

In one or more embodiments, selfies are acquired and classified based on facial expressions, natural language processing of associated text information, and physical properties of the images. An emotional state of the subject is associated with a ground truth label as well as the selfie as the owner of a cell phone or camera. As a result, and through redundancy, the behavioral patterns of subjects that take selfies are included within the deep learning process itself. In addition, the images can be shared as a negative class with other learning processes. For example, if a subject generally goes to sporting games when angry, a selfie taken at a sporting game in combination with facial expression, the system can label the selfie as the subject name, emotion and contextual scene. A combination of this information is then fused into the deep learning process to facilitate classification of subsequent images.

An embodiment of a process for determining a spherical contextual confidence of selfies for associative deep learning includes receiving an image (e.g., selfie), and classifying the image based on natural language processing of related text (e.g., a social media post associated with the image) and physical properties of the image (e.g., facial expressions, a background, a relationship of objects in the image) using a deep neural network as a classification model. The embodiment further includes determining a mood of the image based on the physical properties of the image (e.g., emotional state), and determining a confidence of the classification and mood of the image via negative class training. Often when someone is located at a particular location or event, the person may have the same emotion associated with it. For example, a particular person may usually be angry when attending a sporting event. Accordingly, an emotional state of the user in a particular context may be used to classify subsequent images in the same or a similar context. In particular embodiments, the confidence of the classification and the mood of the image via negative class training utilizes a Skellam distribution and Bessel functions to determine a discrete probability distribution of a difference between a group of selfies with an attached emotion and a candidate image as further described herein. The embodiment further includes updating the classification model based upon the determined confidence of the image.

In accordance with a particular embodiment, a Skellam distribution is used to determine the confidence of an image. In the particular embodiment, looking at a difference between a group of selfies with an attached emotional state and a candidate picture provides K=N1−N2 where N1 is the new image or feature vector and N2 is the average feature vector of the group of selfies. The value k is determined as a threshold of acceptance of a selfie with emotion. An example probability mass function for a Skellam distribution of a difference k=N1−N2 between two independent Poisson-distributed random variables with means $\mu_1$ and $\mu_2$ is given by:

$$p(k, \mu_1, \mu_2) = Pr\{L = k\} = e^{-(\mu_1+\mu_2)}\left(\frac{\mu_1}{\mu_2}\right)I_k(2\sqrt{\mu_1\mu_2}) \quad \text{(EQUATION 1)}$$

where $I_k(z)$ is the modified Bessel function of the first kind, and $$|N1-N2|=k \quad \text{(EQUATION 2)}$$

The above equations (EQUATION 1 and EQUATION 2) show an example of calculating an acceptance threshold when N1 is a known selfie within a given context and provide a probability that an image with feature vector N1 meets the threshold and is a selfie with the given context. The modified Bessel function projects the confidence within a spherical shape as a multidimensional representation of the confidence value. Within the space of confidence, a continuous method for calculating the confidence value is as follows:

$$I_\alpha(x) = i^{-\alpha}J_\alpha(ix) = \sum_{m=0}^{\infty} \frac{1}{m!\Gamma(m+\alpha+1)}\left(\frac{x}{2}\right)^{2m+\alpha} \quad \text{(EQUATION 3)}$$

$$K_\alpha(x) = \frac{\pi}{2}\frac{(I_{-\alpha}(x) - I_\alpha(x))}{\sin(\alpha\pi)} \quad \text{(EQUATION 4)}$$

where $\Gamma(z)$ is the gamma function.

As more information is accumulated from subsequent selfies and the classification model is updated, different feature vectors that radiate in the confidence sphere will have emerging confidence values. Accordingly, various embodiments use associative learning through image classification and contextual scene determination, and use a determined mood to improve ground truth labels based upon association of the mode and context to the image. Further, various embodiments utilize social sharing of ground truth labels (e.g., a status update or other text label associated with an image) based on association of the ground truth labes with the image for negative class training.

In one or more particular embodiments, a received image depicting a user is classified to determine an emotional state or mood associated with the image, and an advertising system sends targeted advertising to the user complimentary to the determined emotional state. In other particular embodiments, the advertising system ceases sending of particular advertisements if the determined emotional state of the user indicates that the user is not likely to be receptive to such advertisements.

An embodiment can be implemented as a software application. The application implementing an embodiment can be configured as a modification of an existing system or platform, as a separate application that operates in conjunction with an existing system or platform, a standalone application, or some combination thereof.

The illustrative embodiments are described with respect to certain types of tools and platforms, procedures and algorithms, services, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
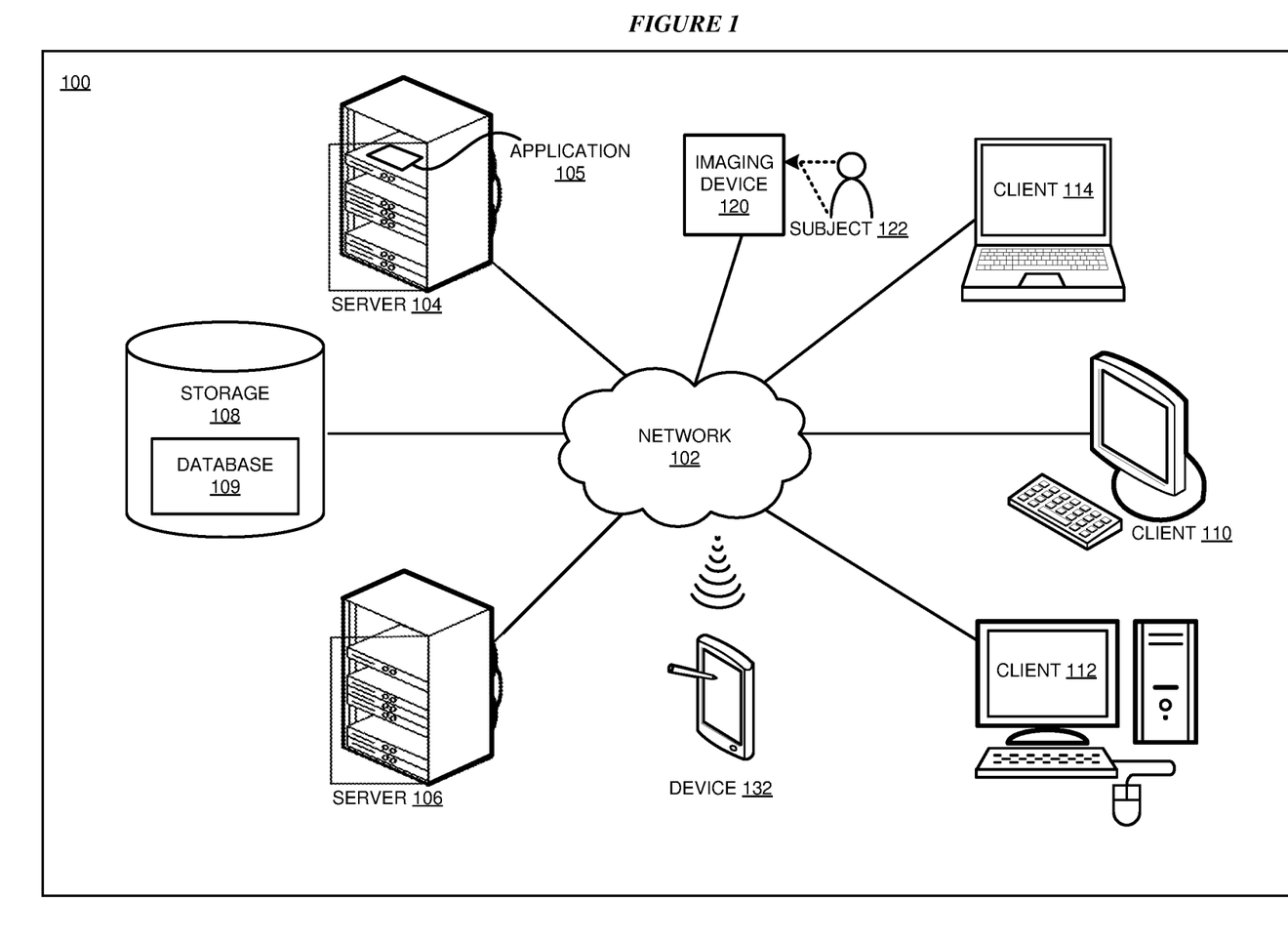
FIG. 1 depicts a block diagram of a network of data processing systems in which illustrative embodiments may be implemented.
Figure 2:
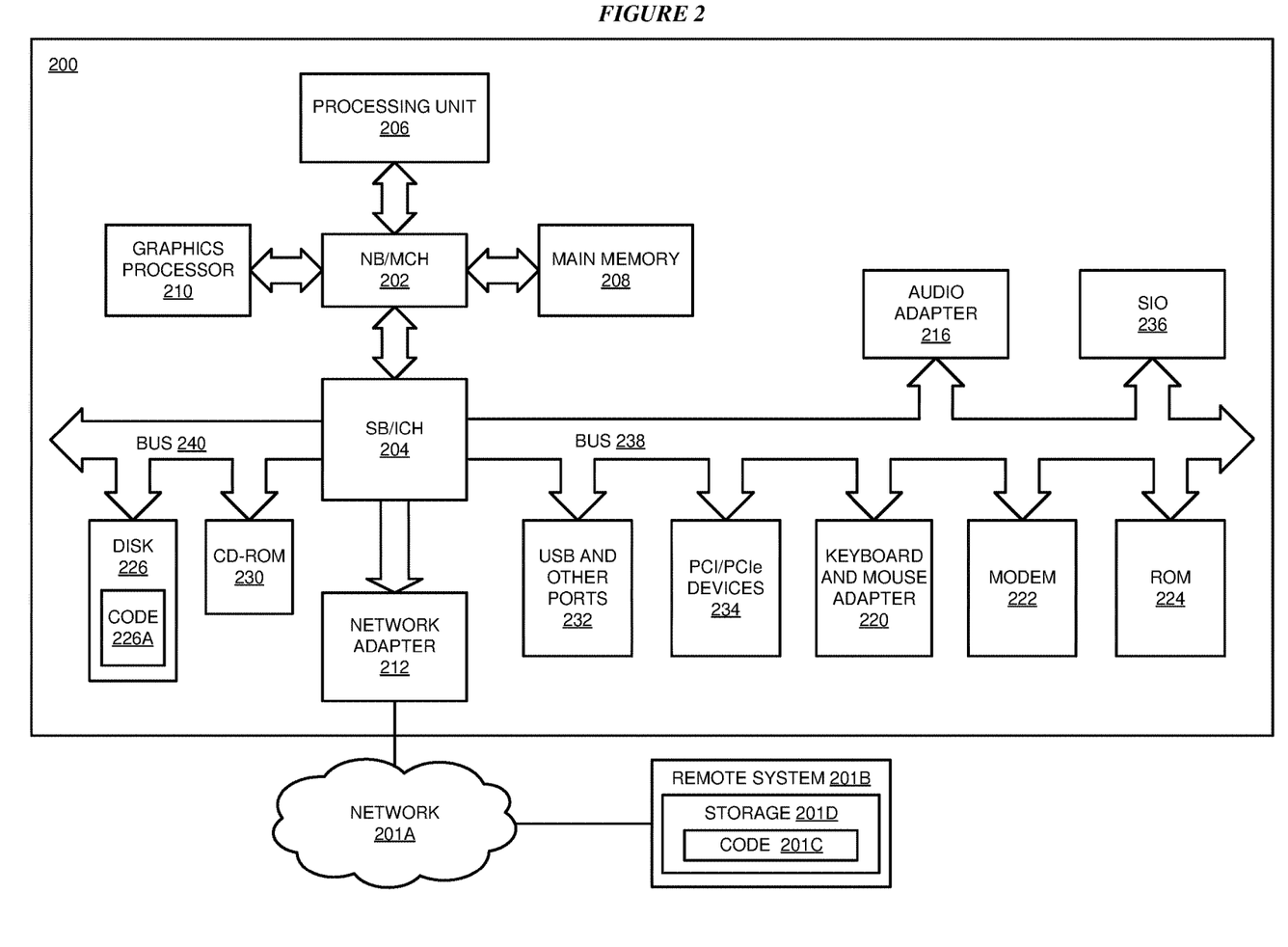
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown. Server 104 includes an application 105 that may be configured to implement one or more of the functions described herein for determining contextual confidence of images using associative deep learning as described herein in accordance with one or more embodiments. Imaging device 120 is configured to capture image data representative of a subject 122, such as a selfie. In particular embodiments, imaging device 116 may include a camera, a smartphone, or any other suitable imaging device. In other embodiments, imaging device 116 may be omitted and the image data may be obtained from another suitable source. Storage device 108 includes one or more databases 109 configured to store data such as images captured by user, textual data associated with the image, and associated contextual information.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D, in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
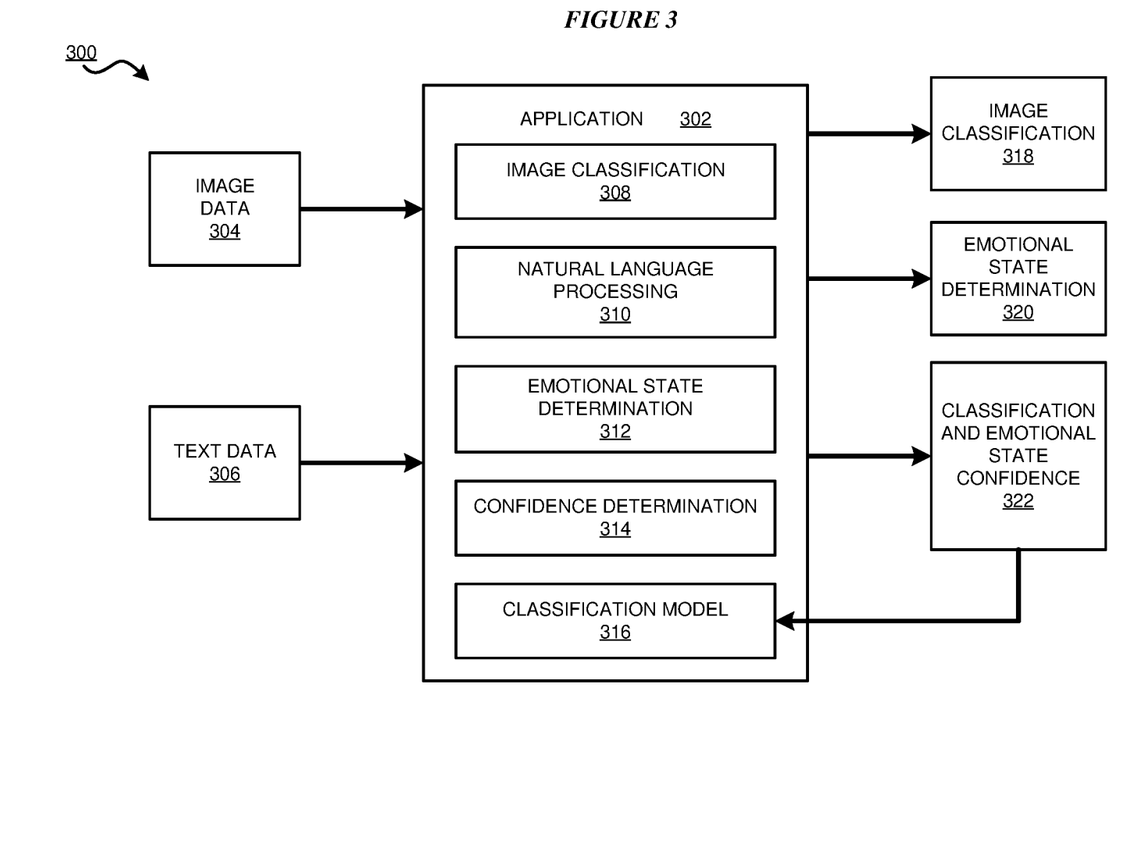
FIG. 3 depicts a block diagram of an example configuration for determining contextual confidence of images using associative deep learning in accordance with an illustrative embodiment.

With reference to FIG. 3, this figure depicts a block diagram of an example configuration 300 for determining contextual confidence of images using associative deep learning in accordance with an illustrative embodiment. The example embodiment includes an application 302. In a particular embodiment, application 302 is an example of application 105 of FIG. 1.

Application 302 receives image data 304 representing a subject and text data 306 associated with the image data 304. In a particular embodiment, image data 304 represents a selfie of a user and text data 306 is related textual information submitted by the user, such as a description of a location or event, in a social media post associated with the image. Application 302 includes an image classification component 308, a natural language processing component 310, an emotional state determination component 312, a confidence determination component 314, and a classification model 316.

In the embodiment, natural language processing component 310 is configured to perform natural language processing (NLP) of text data 306 to determine contextual information of image data 304. Image classification component 308 is determined to classify image data 304 based upon the contextual information and physical properties such as facial expressions of one or more subjects, background information, and relationships of objects, within image data 312 using classification model 316 and output image classification 318. Emotional state determination component 312 is configured to determine an emotional state 320 of image data 304 based upon the physical properties of image data 312. Confidence determination component 314 is configured to determination a confidence of the classification and emotional state of the image using negative class training as classification and emotional state confidence 322. Application 302 further updates classification model 316 based upon the determined confidence of image data 304.

Figure 4:
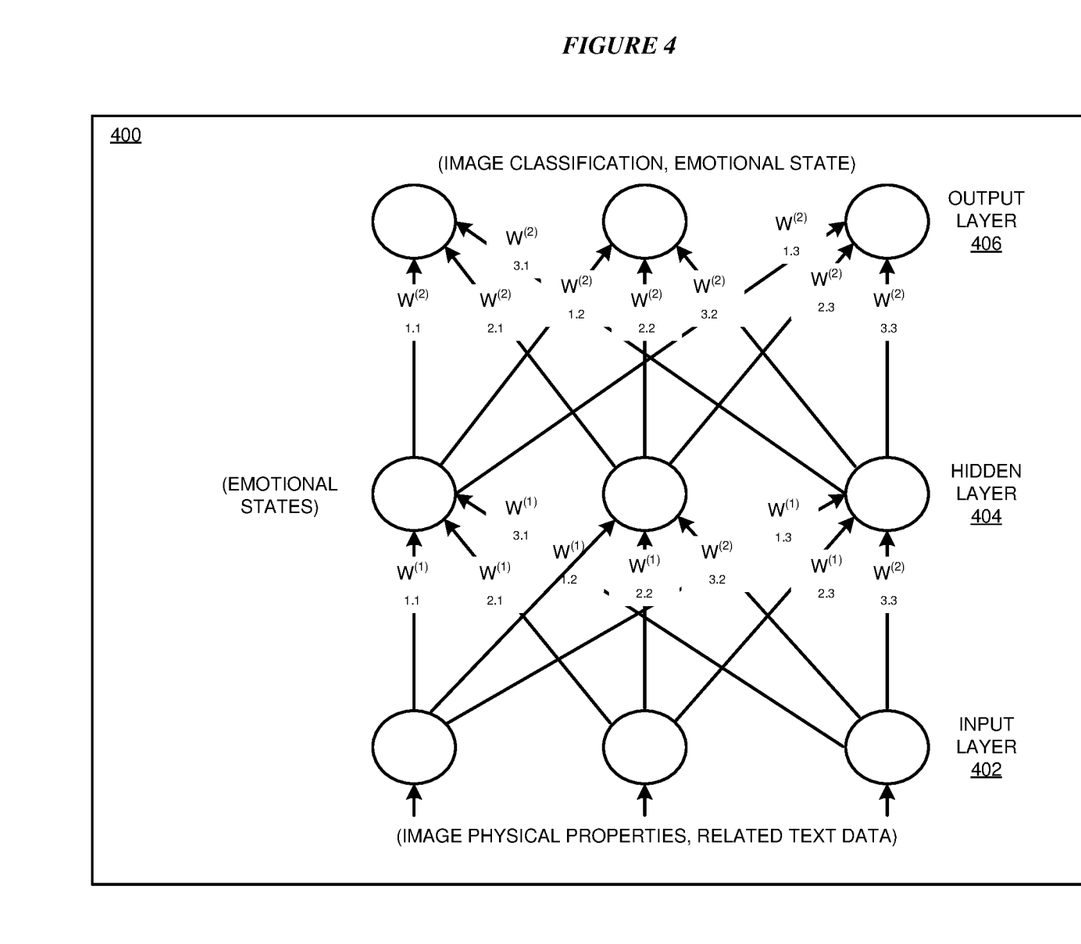
FIG. 4 depicts an embodiment of a deep neural network (DNN) for image classification in accordance with an illustrative embodiment.

With reference to FIG. 4, this figure depicts an embodiment of a deep neural network (DNN) 400 for image classification in accordance with an illustrative embodiment. DNN 400 includes an input layer 402, one or more hidden layers 404, and an output layer 406. In the embodiment, input layer 402 receives image physical properties and related text data associated with an image such as a selfie. One or more hidden layers 404 include models of emotional states and associated image data. Examples of emotional states include moods of a subject such as angry, sad, happy, a tone, introverted, or extroverted. After processing of the image physical properties by one or more hidden layers 404, output layer 406 outputs an image classification of the image and an emotional state of the image.

Figure 5:
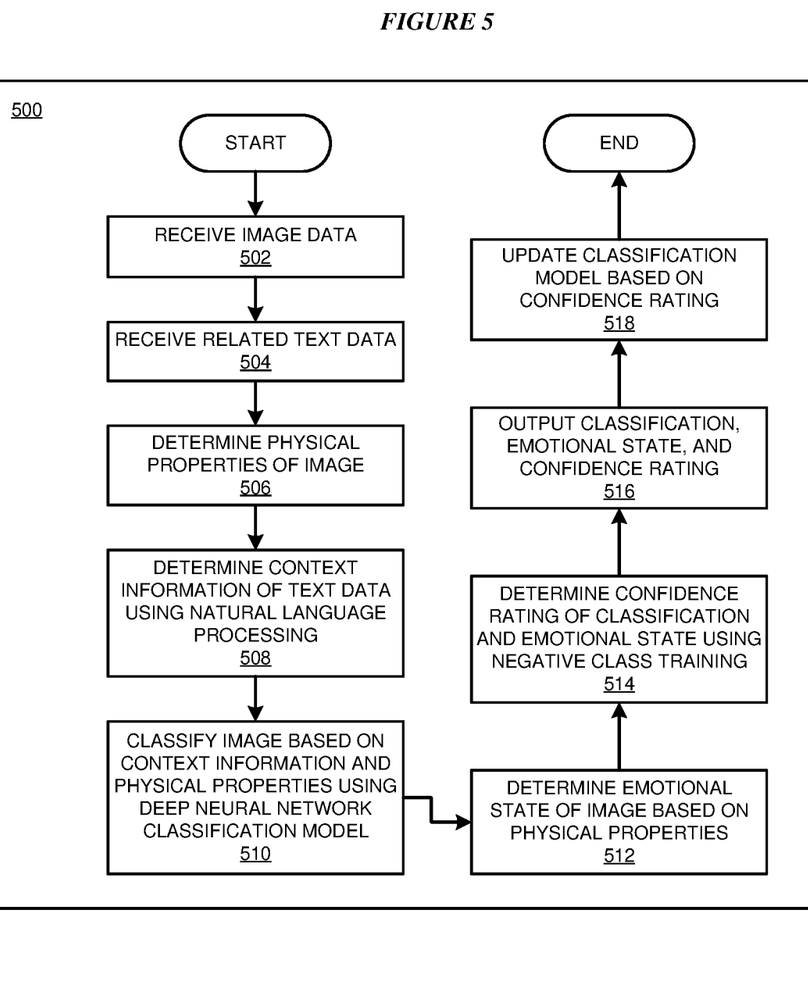
FIG. 5 depicts a flowchart of an example process for determining contextual confidence of images using associative deep learning in accordance with an illustrative embodiment.

With reference to FIG. 5, this figure depicts a flowchart of an example process 500 for determining contextual confidence of images using associative deep learning in accordance with an illustrative embodiment. In block 502, application 105 receives image data representative of an image captured of one or more subjects (e.g., a selfie) in a particular environment or context. In block 504, application 105 receives related text data associated with the image. In one or more embodiments, the related text data is textual information entered by a person who captured the image and included with the image in a social media post to a social media platform.

In block 506, application 105 determines physical properties of the image such as facial expressions of one or more subjects, background information, and a relationship of objects in the image. For example, the physical properties may include a happy facial expression or a baseball stadium in a background of the image. In block 508, application 105 determines context information of the related text data using natural language processing (NLP).

In block 510, application 105 classifies the image based upon the contextual information and physical properties of the image using a classification model. In one or more embodiments, the classification model is a deep neural network. In block 512, application 105 determines an emotional state (e.g., a mood) of the image based upon the physical properties. In block 514, application 105 determines a confidence of the classification and emotional state of the image using negative class training. In particular embodiments, the confidence of the classification and the mood of the image via negative class training utilizes a Skellam distribution and Bessel functions to determine a discrete probability distribution of a difference between a group of images with an attached emotion state and a candidate image. The embodiment further includes updating the classification model based upon the determined confidence of the image.

In block 516, application 105 outputs the classification, emotional state, and confidence rating. In block 518, application 105 updates the classification model (e.g., the deep neural network) based upon the determined confidence rating. Accordingly, when subsequent images, such as selfies, are received, the images are classified using the updated classification model to obtain more accurate classification of the images. Process 500 then ends.

Thus, a computer implemented method, system or apparatus, and computer program product are provided in the illustrative embodiments for determining contextual confidence of images using associative deep learning and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for determining contextual confidence of images for associative deep learning, the method comprising:
   receiving an image including a representation of a subject;
   receiving text data related to the image;
   determining one or more physical properties of the image;
   determining contextual information of the image using natural language processing;
   classifying the image based upon the contextual information and the one or more physical properties using a classification model to determine a classification;
   determining an emotional state of the image based upon the physical properties; and
   determining a confidence of the classification and the emotional state, wherein the confidence of the classification and emotional state is determined using negative class training, wherein the negative class training includes using a probability distribution between a set of images with a known emotional state and a candidate image, wherein the negative class training includes use of a Bessel function.

2. The method of claim 1, further comprising:
   updating the classification model based upon the determined confidence of the classification and the emotional state.

3. The method of claim 1, wherein the classification model includes a deep neural network.

4. The method of claim 1, wherein the probability distribution is a Skellam distribution.

5. The method of claim 1, wherein the text data is included in a social media post associated with the image.

6. The method of claim 1, wherein the one or more physical properties of the image include one or more of a facial expression of the subject in the image, background of the image, or a relationship of objects in the image.

7. The method of claim 1, wherein the emotional state includes a mood of the subject.

8. A computer usable program product comprising one or more computer-readable storage devices, and program instructions stored on at least one of the one or more storage devices, the stored program instructions comprising:
   program instructions to receive an image including a representation of a subject;
   program instructions to receive text data related to the image;
   program instructions to determine one or more physical properties of the image;
   program instructions to determine contextual information of the image using natural language processing;
   program instructions to classify the image based upon the contextual information and the one or more physical properties using a classification model to determine a classification;
   program instructions to determine an emotional state of the image based upon the physical properties; and
   program instructions to determine a confidence of the classification and the emotional state, wherein the confidence of the classification and emotional state is determined using negative class training, wherein the negative class training includes using a probability distribution between a set of images with a known emotional state and a candidate image, wherein the negative class training includes use of a Bessel function.

9. The computer usable program product of claim 8, further comprising:
   program instructions to update the classification model based upon the determined confidence of the classification and the emotional state.

10. The computer usable program product of claim 8, wherein the classification model includes a deep neural network.

11. The computer usable program product of claim 8, wherein the probability distribution is a Skellam distribution.

12. The computer usable program product of claim 8, wherein the computer usable code is stored in a computer readable storage device in a data processing system, and wherein the computer usable code is transferred over a network from a remote data processing system.

13. The computer usable program product of claim 8, wherein the computer usable code is stored in a computer readable storage device in a server data processing system, and wherein the computer usable code is downloaded over a network to a remote data processing system for use in a computer readable storage device associated with the remote data processing system.

14. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
   program instructions to receive an image including a representation of a subject;
   program instructions to receive text data related to the image;

program instructions to determine one or more physical properties of the image;

program instructions to determine contextual information of the image using natural language processing;

program instructions to classify the image based upon the contextual information and the one or more physical properties using a classification model to determine a classification;

program instructions to determine an emotional state of the image based upon the physical properties; and program instructions to determine a confidence of the classification and the emotional state, wherein the confidence of the classification and emotional state is determined using negative class training, wherein the negative class training includes using a probability distribution between a set of images with a known emotional state and a candidate image, wherein the negative class training includes use of a Bessel function.

* * * * *